United States Patent
Manneschi

(10) Patent No.: US 10,859,692 B2
(45) Date of Patent: Dec. 8, 2020

(54) DEVICE AND PROCESS FOR DETECTION OF NON-AUTHORIZED OBJECTS OR SUBSTANCES CARRIED BY AN INDIVIDUAL IN A PROTECTED ACCESS ZONE

(71) Applicant: Alessandro Manneschi, Arezzo (IT)

(72) Inventor: Alessandro Manneschi, Arezzo (IT)

(*) Notice: Subject to any disclaimer, the term of this patent is extended or adjusted under 35 U.S.C. 154(b) by 107 days.

(21) Appl. No.: 16/159,136

(22) Filed: Oct. 12, 2018

(65) Prior Publication Data
US 2019/0113613 A1    Apr. 18, 2019

(30) Foreign Application Priority Data
Oct. 13, 2017  (FR) ...................................... 1759612

(51) Int. Cl.
*G01S 13/86* (2006.01)
*G01S 13/88* (2006.01)
(Continued)

(52) U.S. Cl.
CPC .............. *G01S 13/86* (2013.01); *G01S 7/032* (2013.01); *G01S 13/886* (2013.01);
(Continued)

(58) Field of Classification Search
CPC ........... G01S 13/86; G01S 7/032; G01V 3/10; G01V 8/005
(Continued)

(56) References Cited

U.S. PATENT DOCUMENTS 7,592,907 B2 * 9/2009 Manneschi ............ G01V 3/104
                                                                109/21
7,889,076 B2 * 2/2011 Manneschi ............ G01V 3/104
                                                                340/561
(Continued)

FOREIGN PATENT DOCUMENTS

EP    1574879 A1    9/2005
EP    1750149 A2    2/2007
(Continued)

OTHER PUBLICATIONS

French Search Report for Application No. FR1759612 dated Jun. 8, 2018.

*Primary Examiner* — Kam Wan Ma
(74) *Attorney, Agent, or Firm* — Lerner, David, Littenberg, Krumholz & Mentlik, LLP

(57) ABSTRACT

The invention relates to a device intended for detection of non-authorised objects or substances carried by an individual in a protected access zone, comprising at least two columns defining a channel by which individuals to be checked can transit, windings distributed in the two columns, adapted to emit a magnetic field and adapted to detect the perturbations of the magnetic field caused when an individual travels between the two columns, microwave emitters and receivers arranged in the two columns, and means to analyse the signals to detect the presence of a metallic object carried by an individual to detect the presence of dielectric material carried by the individual transiting via said channel, and to set up the spatial correlations existing between the metallic objects and the dielectric materials detected.

21 Claims, 15 Drawing Sheets

(51) Int. Cl.
  *G01V 8/00* (2006.01)
  *G01S 7/03* (2006.01)
  *G01V 3/10* (2006.01)
  *G08B 21/18* (2006.01)
(52) U.S. Cl.
  CPC .............. *G01S 13/887* (2013.01); *G01V 3/10* (2013.01); *G01V 8/005* (2013.01); *G08B 21/182* (2013.01)
(58) Field of Classification Search
  USPC ...................................................... 340/568.1
  See application file for complete search history.

(56) References Cited

U.S. PATENT DOCUMENTS

| | | | |
|---|---|---|---|
| 8,125,335 B2* | 2/2012 | Manneschi | G01V 3/104 340/5.2 |
| 10,107,933 B2* | 10/2018 | Manneschi | G01V 5/0075 |
| 2005/0116825 A1 | 6/2005 | Manneschi | |
| 2006/0202823 A1 | 9/2006 | Yukl | |
| 2007/0030105 A1* | 2/2007 | Manneschi | G01V 3/104 335/299 |
| 2007/0030141 A1 | 2/2007 | Manneschi et al. | |
| 2007/0073492 A1 | 3/2007 | Manneschi | |
| 2007/0290843 A1 | 12/2007 | Manneschi | |
| 2008/0164420 A1 | 7/2008 | Manneschi | |
| 2010/0161241 A1* | 6/2010 | Manneschi | G01T 1/163 702/22 |
| 2013/0169466 A1* | 7/2013 | Frederick | G08B 13/248 342/22 |
| 2015/0084645 A1 | 3/2015 | Kayano et al. | |
| 2016/0047937 A1* | 2/2016 | Manneschi | G01V 5/0075 356/72 |

FOREIGN PATENT DOCUMENTS

| | | |
|---|---|---|
| EP | 1892542 A2 | 2/2008 |
| EP | 2202700 A1 | 6/2010 |
| FR | 2860631 A1 | 4/2005 |
| FR | 2889338 A1 | 2/2007 |
| FR | 2911212 A1 | 7/2008 |
| WO | 03069320 A2 | 8/2003 |

* cited by examiner

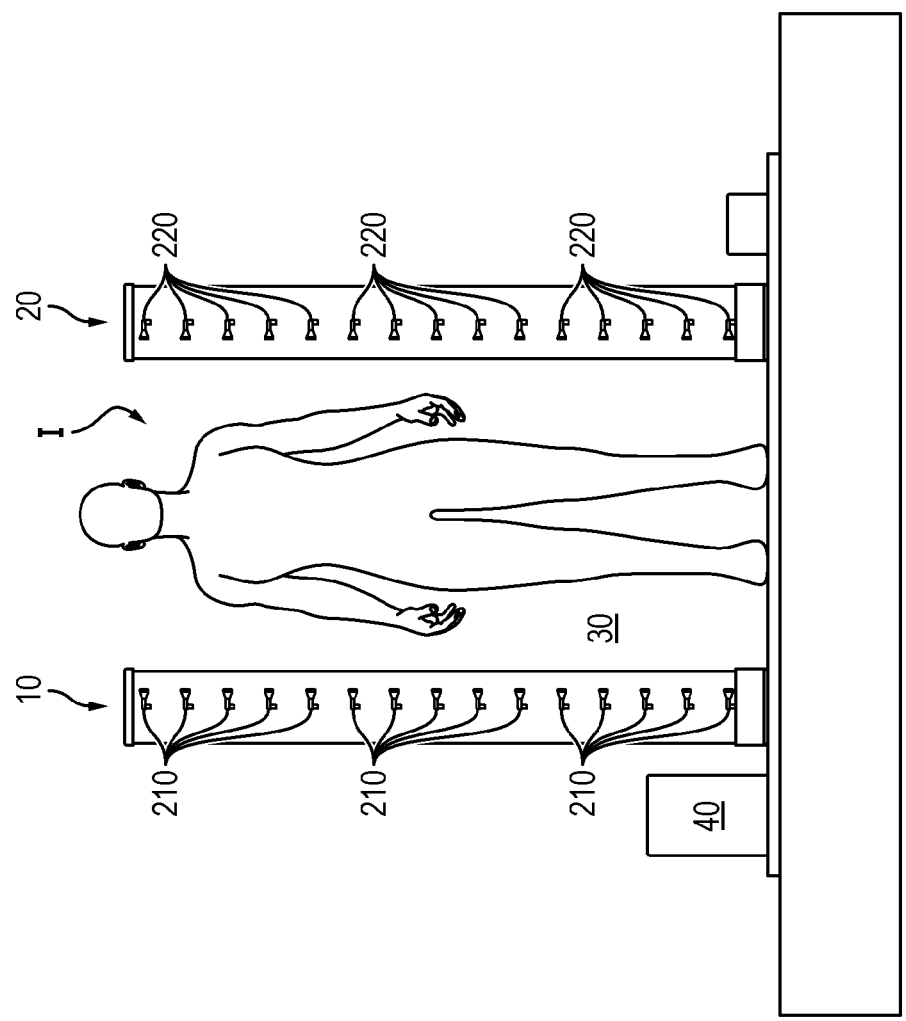
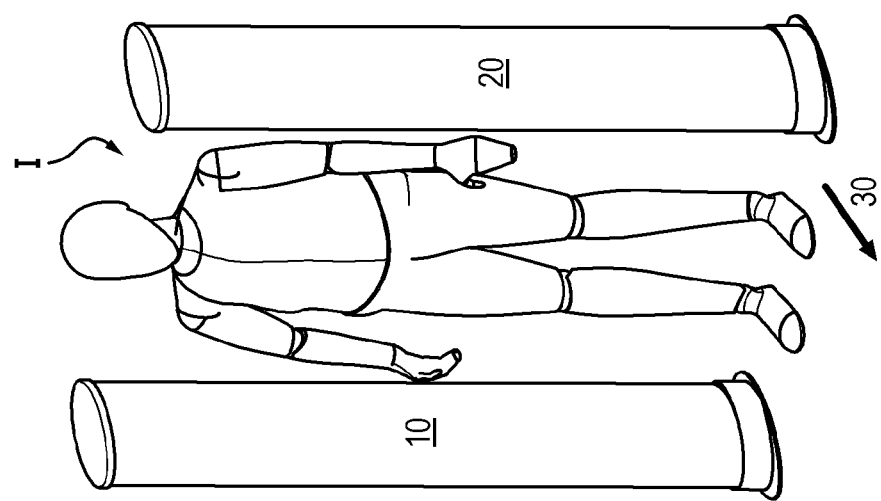

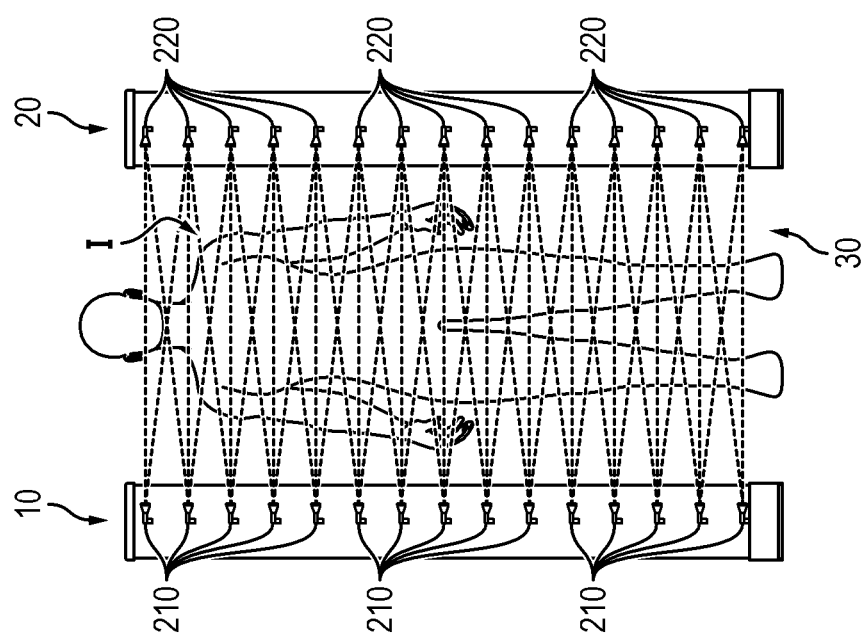

FIG. 9a
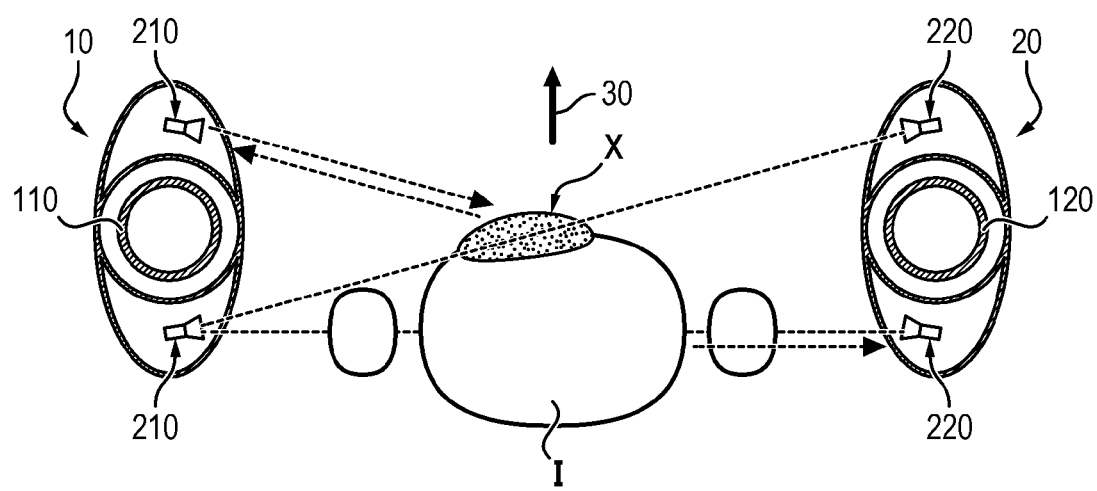
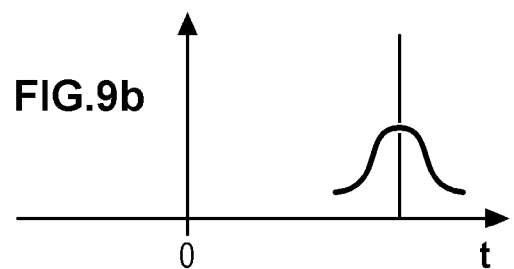
FIG.9b
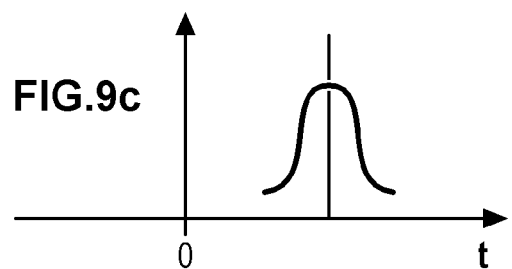
FIG.9c
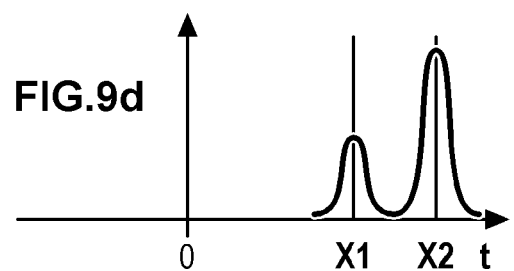
FIG.9d

FIG. 10a
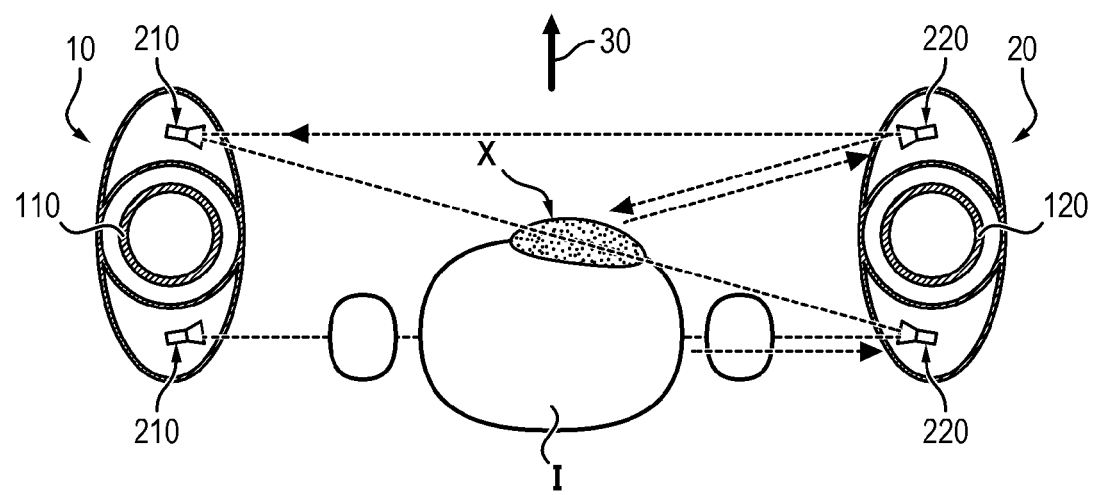
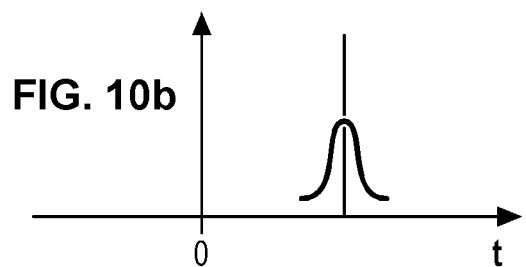
FIG. 10b
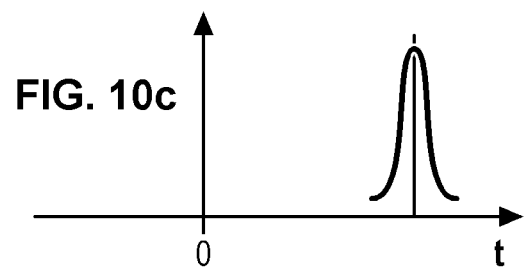
FIG. 10c
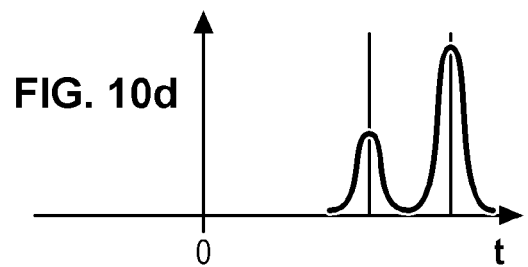
FIG. 10d

|         | 220Rx DAv | 220Rx DAr | 210Rx GAv | 210Rx GAr |
|---------|-----------|-----------|-----------|-----------|
| 210Tx GAv |         |           |           | ✕         |
| 220Tx DAv |         | ✕         |           |           |
| 210Tx GAr |         |           | ✕         |           |
| 220Tx DAr | ✕       |           |           |           |

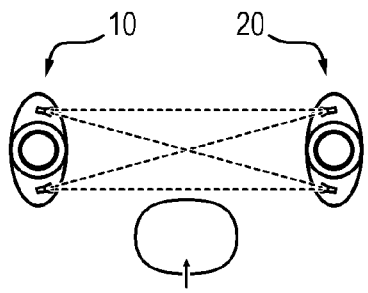

FIG. 14a

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | Rx | ✕ | 0 |
| 220Tx DAr | ✕ | 0 | Rx | Rx |

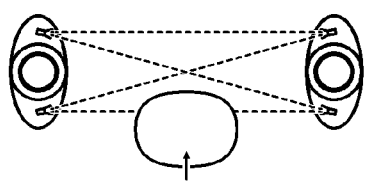

FIG. 14b

| | 220Rx DAv | 220Rx DAr | 210Rx GAv | 210Rx GAr |
|---|---|---|---|---|
| 210Tx GAv | 0 | Rx | Echo | ✕ |
| 220Tx DAv | Echo | ✕ | 0 | Rx |
| 210Tx GAr | Rx | Rx | ✕ | 0 |
| 220Tx DAr | ✕ | 0 | Rx | Rx |

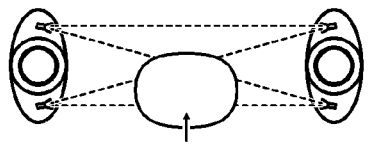

FIG. 14c

| | 220Rx DAv | 220Rx DAr | 210Rx GAv | 210Rx GAr |
|---|---|---|---|---|
| 210Tx GAv | 0 | 0 | Echo | ✕ |
| 220Tx DAv | Echo | ✕ | 0 | 0 |
| 210Tx GAr | 0 | Rx | ✕ | Echo |
| 220Tx DAr | ✕ | Echo | 0 | Rx |

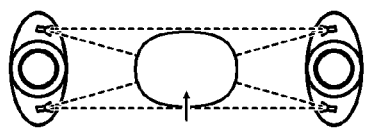

FIG. 14d

| | 220Rx DAv | 220Rx DAr | 210Rx GAv | 210Rx GAr |
|---|---|---|---|---|
| 210Tx GAv | Rx | 0 | Echo | ✕ |
| 220Tx DAv | Echo | ✕ | Rx | 0 |
| 210Tx GAr | 0 | Rx | ✕ | Echo |
| 220Tx DAr | ✕ | Echo | 0 | Rx |

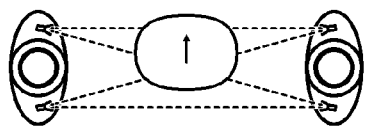

FIG. 14e

| | 220Rx DAv | 220Rx DAr | 210Rx GAv | 210Rx GAr |
|---|---|---|---|---|
| 210Tx GAv | Rx | 0 | Echo | ✕ |
| 220Tx DAv | Echo | ✕ | Rx | 0 |
| 210Tx GAr | 0 | 0 | ✕ | Echo |
| 220Tx DAr | ✕ | Echo | 0 | 0 |

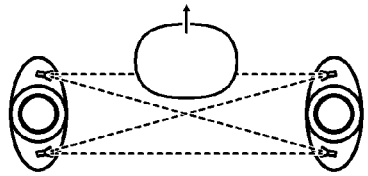

FIG. 14f

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | 0 | ✕ | Echo |
| 220Tx DAr | ✕ | Echo | Rx | 0 |

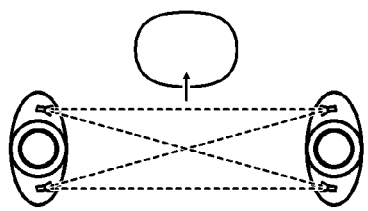

FIG. 14g

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | Rx | ✕ | 0 |
| 220Tx DAr | ✕ | 0 | Rx | Rx |

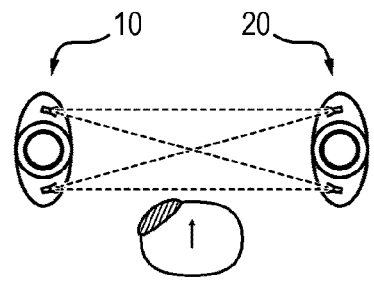

FIG. 17a

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | Rx | ✕ | 0 |
| 220Tx DAr | ✕ | 0 | Rx | Rx |

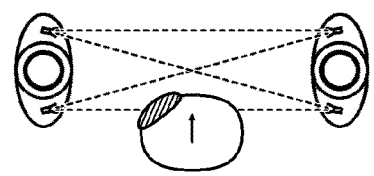

FIG. 17b

| | 220Rx DAv | 220Rx DAr | 210Rx GAv | 210Rx GAr |
|---|---|---|---|---|
| 210Tx GAv | 0 | Rx | Double echo | ✕ |
| 220Tx DAv | Echo | ✕ | 0 | Rx |
| 210Tx GAr | Rx | Rx | ✕ | 0 |
| 220Tx DAr | ✕ | 0 | Rx | Rx |

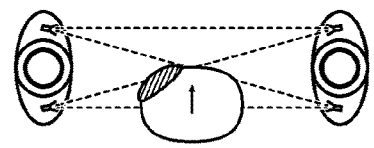

FIG. 17c

| | 220Rx DAv | 220Rx DAr | 210Rx GAv | 210Rx GAr |
|---|---|---|---|---|
| 210Tx GAv | 0 | 0 | Triple echo | ✕ |
| 220Tx DAv | Echo | ✕ | 0 | 0 |
| 210Tx GAr | 0 | Rx | ✕ | Double echo |
| 220Tx DAr | ✕ | Echo | 0 | Rx |

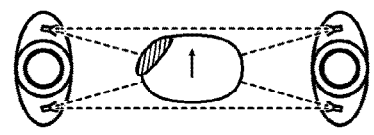

FIG. 17d

| | 220Rx DAv | 220Rx DAr | 210Rx GAv | 210Rx GAr |
|---|---|---|---|---|
| 210Tx GAv | Rx | 0 | Echo | ✕ |
| 220Tx DAv | Echo | ✕ | Rx | 0 |
| 210Tx GAr | 0 | Rx | ✕ | Double echo |
| 220Tx DAr | ✕ | Echo | 0 | Rx |

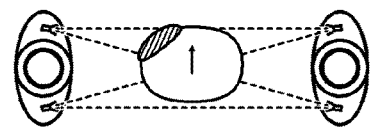

FIG. 17e

| | 220Rx DAv | 220Rx DAr | 210Rx GAv | 210Rx GAr |
|---|---|---|---|---|
| 210Tx GAv | Rx | 0 | Echo | ✕ |
| 220Tx DAv | Echo | ✕ | Rx | 0 |
| 210Tx GAr | 0 | 0 | ✕ | Triple echo |
| 220Tx DAr | ✕ | Echo | 0 | 0 |

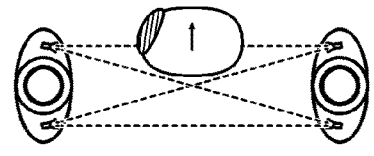

FIG. 17f

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | 0 | ✕ | Double echo |
| 220Tx DAr | ✕ | Echo | Rx | 0 |

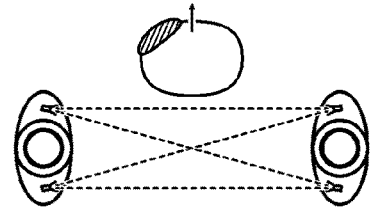

FIG. 17g

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | Rx | ✕ | 0 |
| 220Tx DAr | ✕ | 0 | Rx | Rx |

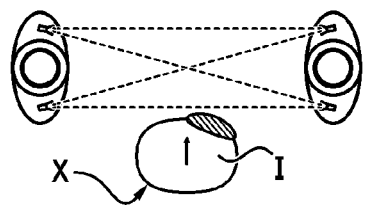

FIG. 18a

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | Rx | ✕ | 0 |
| 220Tx DAr | ✕ | 0 | Rx | Rx |

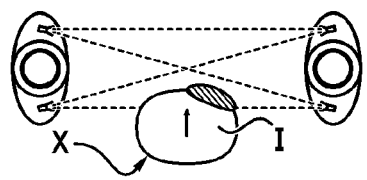

FIG. 18b

| | 220Rx DAv | 220Rx DAr | 210Rx GAv | 210Rx GAr |
|---|---|---|---|---|
| 210Tx GAv | 0 | Rx | Echo | ✕ |
| 220Tx DAv | Double echo | ✕ | 0 | Rx |
| 210Tx GAr | Rx | Rx | ✕ | 0 |
| 220Tx DAr | ✕ | 0 | Rx | Rx |

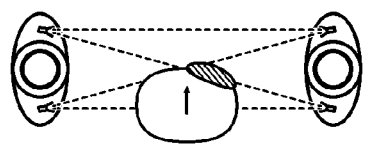

FIG. 18c

| | 220Rx DAv | 220Rx DAr | 210Rx GAv | 210Rx GAr |
|---|---|---|---|---|
| 210Tx GAv | 0 | 0 | Echo | ✕ |
| 220Tx DAv | Triple echo | ✕ | 0 | 0 |
| 210Tx GAr | 0 | Rx | ✕ | Echo |
| 220Tx DAr | ✕ | Double echo | 0 | Rx |

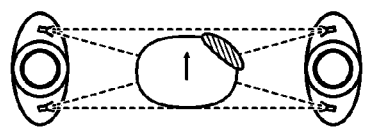

FIG. 18d

| | 220Rx DAv | 220Rx DAr | 210Rx GAv | 210Rx GAr |
|---|---|---|---|---|
| 210Tx GAv | Rx | 0 | Echo | ✕ |
| 220Tx DAv | Echo | ✕ | Rx | 0 |
| 210Tx GAr | 0 | Rx | ✕ | Echo |
| 220Tx DAr | ✕ | Double echo | 0 | Rx |

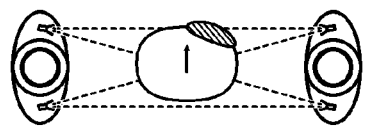

FIG. 18e

| | 220Rx DAv | 220Rx DAr | 210Rx GAv | 210Rx GAr |
|---|---|---|---|---|
| 210Tx GAv | Rx | 0 | Echo | ✕ |
| 220Tx DAv | Echo | ✕ | Rx | 0 |
| 210Tx GAr | 0 | 0 | ✕ | Echo |
| 220Tx DAr | ✕ | Triple echo | 0 | 0 |

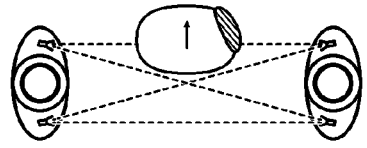

FIG. 18f

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | 0 | ✕ | Echo |
| 220Tx DAr | ✕ | Double echo | Rx | 0 |

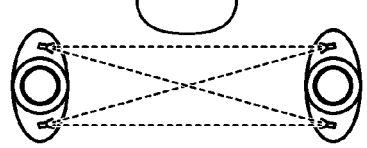

FIG. 18g

| | 220Rx DAv | 220Rx DAr | 210Rx GAv | 210Rx GAr |
|---|---|---|---|---|
| 210Tx GAv | Rx | Rx | 0 | ✕ |
| 220Tx DAv | 0 | ✕ | Rx | Rx |
| 210Tx GAr | Rx | Rx | ✕ | 0 |
| 220Tx DAr | ✕ | 0 | Rx | Rx |

DEVICE AND PROCESS FOR DETECTION OF NON-AUTHORIZED OBJECTS OR SUBSTANCES CARRIED BY AN INDIVIDUAL IN A PROTECTED ACCESS ZONE

CROSS REFERENCE TO RELATED APPLICATIONS

The present application claims priority from French Patent Application 1759612 filed on Oct. 13, 2017, the disclosure of which is hereby incorporated herein by reference.

FIELD OF THE INVENTION

The present invention relates to the field of detectors designed for detection of non-authorised objects or substances in a protected access zone.

TECHNOLOGICAL BACKGROUND

Today it seems necessary to highly reliably control attempts to introduce or take out specific products, for example but not exclusively explosive materials, in or outside a sensitive zone.

The problem raised here covers a very wide range of situations, which encompasses especially and non-limiting the attempt to introduce products to a protected zone, such as a shop, school, train station, a public or even private body, or the attempt to take products outside a defined perimeter, for example in the case of company theft or at a protected site.

For many years now walk-through metal detectors based on inductive windings have been proposed especially. The general structure and the general operation of these devices are well known to the skilled person. Essentially, sender windings generate a magnetic field and receiver windings detect the perturbations of this field due to metallic objects carried by an individual who is transiting through the gate detector. Examples of such walk-through metal detectors are disclosed in documents EP 1 750 147 and EP 1 892 542.

For several years, body scanners have been developed to detect arms, explosives, etc. hidden under clothing of individuals entering a protected zone. All these systems utilize technologies based on the detection of radiation energies modulated or emitted by the body of the inspected individuals. Radiation energies used in this way include X-rays, microwaves, millimetric waves, infrared light, terahertz waves and ultrasound.

An example of a body scanner is described in document EP 2 202 700.

Despite the use of several types of radiation energies and imaging geometries, the principle of all these body scanners is the creation of an electronic image of the individual on which the clothing of the individual is transparent. This image is then displayed on a monitor and viewed by an operator so that the latter determines whether the individual is carrying a target object. For this, the operator, who is trained in detection of target objects, must be able to determine if those objects identified by the body scanner correspond to the human anatomy, to an authorized object such as a lighter, a handkerchief or other pieces, or to a target object such as a weapon or an explosive.

The applicant has therefore proposed devices which comprise a frame which comprises a support base formed by a rectangular board in the form of a step whereof the plane upper surface comprises a design or print and a stop intended to receive and position a single foot of an individual covered by a shoe, two symmetrical lateral panels which house detection means, and an information module.

Examples of this device are disclosed in documents FR 2860631, EP 1574879, FR 2889338 and FR 2911212.

The detection means described in the documents mentioned can be formed by windings for detection of metals, sampling means, for example in the form of suction nozzles, for drawing off steam or traces of particles, for example drugs or explosives, analysis means based on nuclear magnetic resonance comprising for example Helmholtz coils, or again complex impedance analysis means or radioactive radiation detectors.

All these known devices have already provided great service.

But today it proves necessary to allow for even more precise detections.

In particular, today there is the problem of control of access to public premises, such as stadiums and large theatres, or the influx rate has to be several hundred people per hour (up to 1000 people/hour). Operating Body scanners requires each person to be stationary for several seconds to allow the microwave transducers to read and for analysis of the signals obtained by the measuring. The rate which can be achieved, although acceptable for example for airport control, is very low and totally insufficient for public applications.

SUMMARY OF THE INVENTION

An aim of the invention is therefore to propose novel detection means for improving the detection of target objects likely to be carried by an individual.

An aim of the invention is in particular to propose detection means which are effective irrespective of the site where a fraudulent object is fastened on to an individual, more precisely whether on the front of the body, the rear of the body, or a part of the body, or even a combination of these arrangements.

Another aim of the invention is to propose a system which allows reading or examination on the fly of the person to define whether the perimeter of his body is free or if he is carrying superposed metallic and/or dielectrical objects.

These aims are attained according to the invention by way of a device which comprises:
  at least two columns together defining a channel by which individuals to be checked can transit,
  windings distributed in the two columns, adapted to emit a magnetic detection field and adapted to detect the perturbations of the magnetic detection field caused when an individual travels via the channel between the two columns,
  microwave sender/receiver means arranged in the two columns, and
  analysis means adapted to analyse the signals from the receiver windings to detect the presence of a metallic object carried by an individual transiting via said channel formed between the two columns, to analyse the signals from microwave receivers corresponding to the signals transmitted from one column into the column opposite and into the signals reflected from one column towards this same column to detect the presence of dielectric material carried the individual transiting via said channel and to set up the spatial correlations existing between the metallic objects and the dielectric materials detected.

In contrast to body scanners which require each person to be checked to be stationary, the system according to the present invention performs analysis which uses the movement of the person as "spatial scanning" of his perimeter relative to the columns of inductive and microwave senders and receivers, accordingly resolving the need for a high rate.

The invention relates to also a process for detection of fraudulent objects carried by an individual by means of the above device.

BRIEF DESCRIPTION OF DRAWINGS

Other characteristics, aims and advantages of the present invention emerge more clearly from the following detailed description and with respect to the appended drawings given by way of non-limiting examples in which:

FIG. 1 illustrates a perspective view of a device according to the present invention, FIG. 2 illustrates the same device by schematically illustrating the positioning of microwave sender/receiver means arranged in the two columns of the device, FIG. 3 illustrates a schematic vertical view of microwave beams emitted by the device according to the present invention, FIG. 4a schematically illustrates in plan view the microwave emissions from a sender located on a column in the direction of a receiver located on the opposite column FIG. 10a illustrates a case similar to FIG. 9a, the fraudulent object being carried on the opposite side of the individual and FIGS. 10b, 10c and 10d illustrate respectively the transmitted signal, the reflected signal on the individual and the double echo similar to FIGS. 9b, 9c and 9d, FIG. 11a schematically illustrates in plan view the microwave emissions/receptions in the case of an individual transiting via the channel and carrying laterally a fraudulent object, FIG. 11b schematically illustrates the signal reflected on the individual characterized by a specific time delay and FIG. 11c schematically illustrates a reflected double echo of a part on the fraudulent object and of another part on the body of the individual each characterized by a specific time delay and attenuation, FIG. 12 schematically illustrates a flowchart of a process for determination of spatial correlation between detection of a metallic object by means of windings and a dielectric object by means of microwave transducers, FIG. 13a schematically illustrates 4 transducers distributed by pairs at the same horizontal level on the two columns, due to a transducer located on the input and a transducer located on the output of each column, FIGS. 14a to 14g illustrate 7 successive steps of progression type of an individual in the channel and the corresponding detection matrices on the microwave receiver transducers, FIGS. 17a to 17g illustrate the successive steps of progression of an individual in the channel and the corresponding detection matrices on the microwave receiver transducers, similar to FIGS. 14a to 14g, in the case where the individual carries on the front of his body and on his left side a fraudulent dielectric element, and FIGS. 18a to 18g illustrate the successive steps of progression of an individual in the channel and the corresponding detection matrices on the microwave receiver transducers, similar to FIGS. 14a to 14g, in the case where the individual carries on the front of his body and on his right side, a fraudulent dielectric element.

DETAILED DESCRIPTION OF AN EMBODIMENT

Figure 4A:
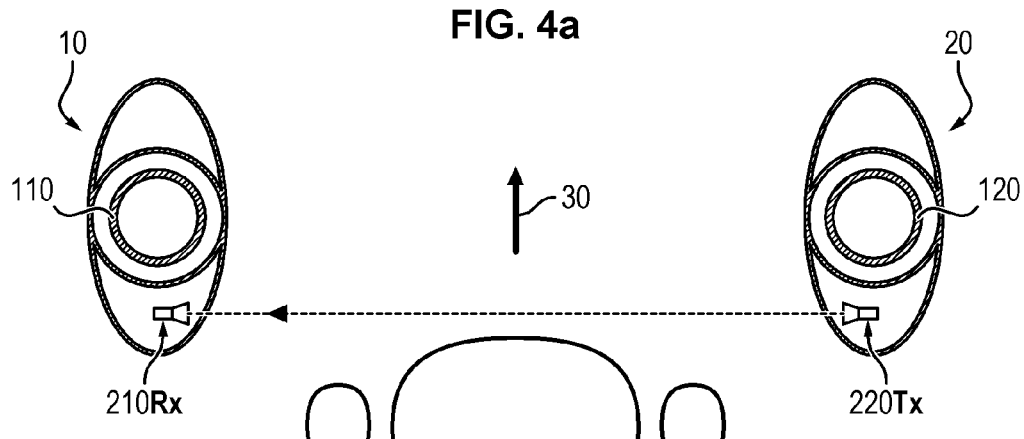
FIG. 4b illustrates the signal received on the receiver before an individual intercepts the microwave beam.

The attached figures, especially FIG. 1, illustrate a device according to the present invention comprising two columns 10, 20 together defining a channel 30 by which individuals I to be checked can transit.

By way of non-limiting example, the height of the columns 10, 20 can be between 150 and 200 cm, advantageously between 150 and 180 cm and the gap between the two columns is advantageously between 70 and 100 cm.

As indicated previously the device according to the present invention comprises windings 110 120 distributed in the two columns. These windings 110, 120 are adapted to emit a magnetic detection field and are adapted to detect the perturbations of the magnetic detection field caused when an individual travels via the channel between the two columns.

Such windings 110, 120 are illustrated especially in FIGS. 4 to 11. They cover preferably the entire height of the columns 10, 20.

The device according to the present invention also comprises analysis means 40 adapted to analyse the signals from the receiver windings 110Rx and 120Rx to detect the presence of a metallic object carried by an individual I transiting via said channel 30 formed between the two columns 10, 20.

The windings 110, 120 can form the object of many known embodiments, such as used currently in classic walk-through metal detectors. Their operation as such is also classic.

The structure and the operation of the windings 110, 120 will therefore not be described in detail below.

It is evident however that preferably each winding 110, 120 provided respectively on the columns 10 and 20 can be formed by several separate turns whereof the distribution relates to the height of the columns 10 and 20 is adapted to optimize detection and is controlled by the analysis means to emit alternative inductive fields over a range of frequencies and respectively receive all these alternative inductive fields over said range of frequencies.

These arrangements are also known per se and will therefore not be described in detail below.

Preferably, the inductive fields of metal detectors generated by the windings 110, 120 are in the range of frequencies between 70 Hz and 30 kHz, As also indicated previously, the device according to the present invention also comprises means 210, 220 forming microwave sender/receiver transducers arranged respectively in the two columns 10, 20.

Hereinbelow, these transducers 210, 220 will be accompanied by the index Tx when they will be senders and Rx when they will be receivers.

Preferably, each transducer 201, 220 can successively and alternatively be sender and/or receiver.

Also the analysis means 40 are adapted to analyse the signals from microwave receivers 210Rx and 220Rx.

More precisely, as indicated previously the analysis means 40 of the device according to the present invention are adapted to analyse the signals from microwave receivers 210Rx and 220Rx corresponding to the microwave signals transmitted from one column into the column opposite and into the microwave signals reflected from one column towards this same column to detect the presence of dielectric material carried the individual I transiting via said channel and to set up the spatial correlations existing between the metallic objects and the dielectric materials detected.

"Set up the spatial correlations between the metallic objects and the dielectric materials detected" means that the analysis means 40 are adapted to search if the signals from microwave receivers 210Rx and 220Rx result in detecting any fraudulent object on a part of the body of the individual I which correspond also in space to detection of metal from processing of signals taken from the receiver windings 110 and 120.

Figure 12:
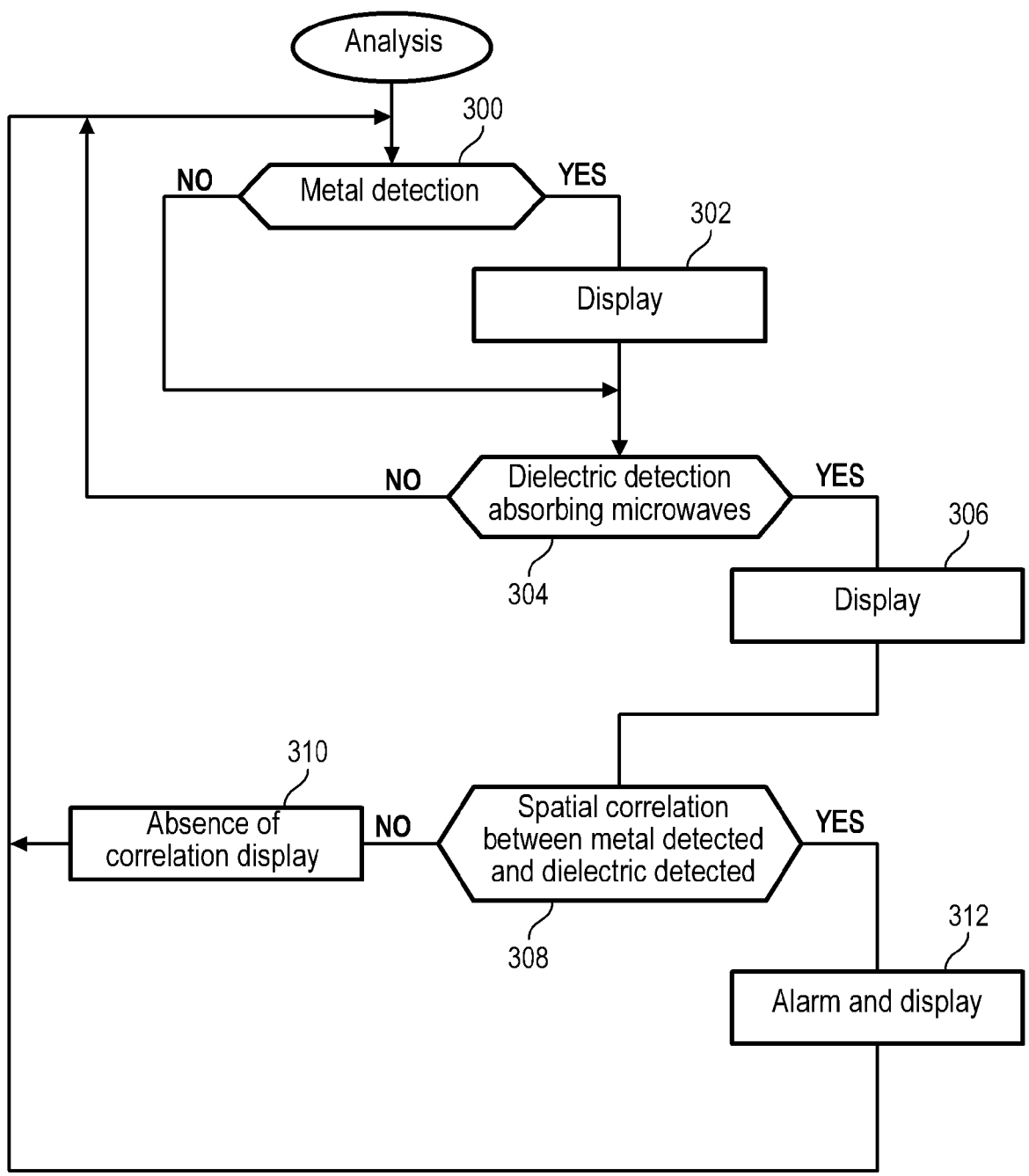

FIG. 12 schematically illustrates the main steps of the process for determination of spatial correlation between a metallic object by means of the windings 110, 120 and a dielectric object by means of the microwave transducers 210, 220.

The steps 300 and 304 correspond respectively to detection of a metallic object by means of the windings 110, 120 and a dielectric object by means of the microwave transducers 210, 220. These steps 300 and 304 loop back on themselves provided no detection is performed. If needed, the steps 300 and 304 can be followed by respective steps of display during detection of a metallic object by means of the windings 110, 120, or respectively a dielectric object by means of the microwave transducers 210, 220.

When a metallic object is detected at step 300 and a dielectric object is detected at step 304, the search step 308 of spatial correlation between the metallic object and the dielectric object is performed by the analysis means 40. That is, the analysis means search whether the metallic object and the dielectric object are detected on the same part of the body of the individual who is travelling via the channel 30.

In case of detection of such a correlation a corresponding alarm and a display are operated at step 312.

The process is repeated originally after the display step 312.

The process is similarly repeated originally if the search step 308 of spatial correlation reveals no correlation.

In the same way, a display can be provided, adapted to the step 310 during the detection separately of a metallic object and a dielectric object, without spatial correlation between these two objects.

Such correlation between dielectric material and metal helps the personnel who controls access by the device to specify diagnosis on the nature of the fraudulent object carried by the individual and consequently adapts the nature of operations to engage in.

The device according to the present invention comprises also display means adapted to display the detected alarms.

These display means are preferably adapted to display the height and the right or left side of the channel on which a metallic object and a dielectric object are detected in correlation.

More precisely still, the display means according to the present invention are preferably adapted to display a silhouette of front and rear type of the individual travelling in the channel, dimensioned in size on the basis of a measurement made by detection of reflection of microwave beams, with positioning and indication of the nature of the metallic objects and the non-metallic dielectric objects detected.

The microwave sender/receiver transducers 210, 220 preferably comprise several microwave transducers distributed vertically on each column 10, 20. As shown in FIG. 2 transducers 15 superposed vertically with a gap of the order of 2 to 10 cm between two adjacent transducers can also be provided.

Preferably, each microwave transducer 210, 220 is associated with a focus cone adapted to control the angular opening of the emission cone of each transducer such that all the transducers 210, 220 constitute a vertical continuous curtain or at least continuous curtain. Preferably, the vertical distribution of the transducers 210, 220 and their emission and reception lobe are determined such that the microwave beams constitute a continuous curtain at least in the longitudinal median plane of the channel 30.

The transducers 210, 220 preferably operate in a range of frequencies between 5 and 90 GHz, advantageously between 10 and 30 GHz and most preferably between 12 and 20 GHz.

The different transducers 210, 220 located on a column 10 or 20, for example the fifteen transducers distributed vertically, are located respectively coaxially to a transducer 220, 210 located opposite on the opposite column 20, 10.

Under the control of the analysis means 40 each transducer 210, 220 can work alternatively as sender (or 210Tx, 220Tx) or as receiver (or 210Tx, 220Tx) or as sender and receiver.

As illustrated in FIG. 3, each sender 210Tx, 220Tx is preferably adapted to emit in the direction of a coaxial receiver 220Rx, 210Rx on the opposite column, and in the direction of the transducers adjacent to this coaxial transducer opposite, that is, in the direction of the immediately upper transducer and of the immediately lower transducer.

Similarly, as illustrated also in FIG. 3, each receiver 210Rx, 220Rx is preferably adapted to receive from a coaxial sender 220Tx, 210Tx located on the opposite column, and from the transducers adjacent to this coaxial sender transducer opposite that is, from the immediately upper transducer and of the immediately lower transducer.

As is seen in FIG. 4*a*, in terms of the present invention, each column 10, 20 can comprise a single vertical series of microwave transducers 210, 220, for example on the side input of the channel 30. According to FIG. 4*a*, the windings 110, 120 used for detection of metals are located at the centre of the columns 10, 20.

But as illustrated in FIGS. 6 to 11, each column 10, 20 can comprise several vertical series of microwave transducers 210, 220. According to the attached FIGS. 6 to 11 which correspond to a non-limiting illustration, windings 110, 120 are provided and used for detection of the metals at the centre of each column 10, 20 and a series of microwave transducers 210, 220 respectively on the input side and on the output side of the windings 110, 120, on each column 10, 20.

The horizontal distance between two transducers 210, 220 located in the same column is typically between 10 and 30 cm.

Figure 4B:
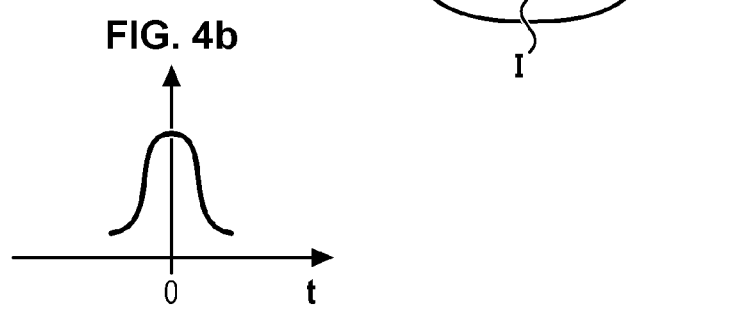

As is seen in FIG. 4*b*, which corresponds to the situation illustrated in FIG. 4*a* of an individual I who is about to enter the channel 30, when no object or individual is interposed between a sender transducer 220Tx and a receiver transducer 210Rx, the receiver transducer 210Rx receives a signal with only a slight delay due to transmission in the air, without noticeable attenuation in amplitude.

Figure 5A:
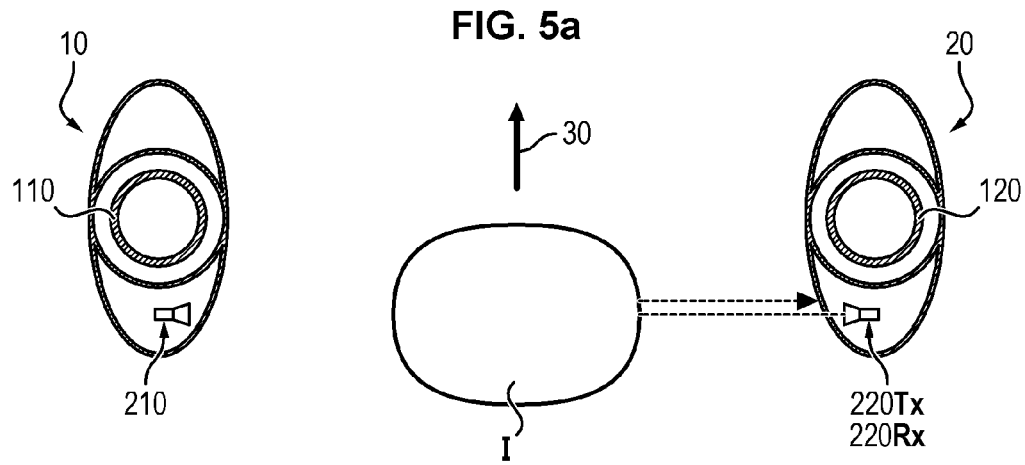
FIG. 5a illustrates a similar view when an individual intercepts the microwave beam and FIG. 5b illustrates the signal reflected towards the sender transducer/receiver, FIG. 6 schematically illustrates in plan view the interactions which can occur between the sender transducers and the receiver transducers when each sender transducer is adapted to emit in the direction of several receiver transducers and symmetrically each receiver transducer is adapted to receive the beams emitted by several sender transducers, FIG. 7a schematically illustrates in plan view the emissions/receptions microwaves in the case of an individual transiting via the channel and carrying on the front a fraudulent object, FIG. 7b schematically illustrates the signal transmitted via this object characterized by a specific time delay and attenuation
Figure 5B:
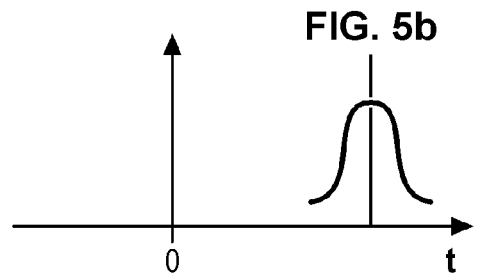
Figure 6:
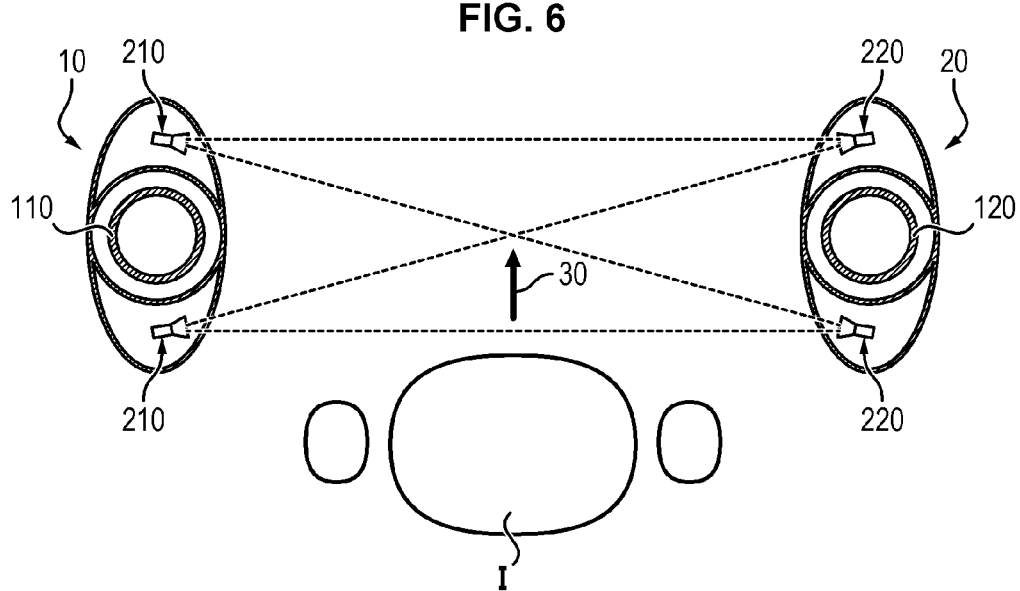

But as seen in FIG. 5*b* which corresponds to the situation illustrated in FIG. 5*a* of an individual entering the channel 30 and situated between a pair of transducers 210, 220, reception on the receiver transducer Rx is perturbed.

More precisely as seen in FIG. 5, the microwave beam emitted by a sender 220Tx is reflected almost fully in the direction of the same transducer 220 functioning as receiver 220Rx, due to the water density of the body of the individual I, with a delay equal to 2*d/c, d representing the distance between the sender 220Tx and the body of the individual I and c representing the speed of microwaves in the air.

Via exploitation of detected reflections, the device according to the present invention determines the size in height of an individual I who is transiting via the channel 30.

Figure 7A:
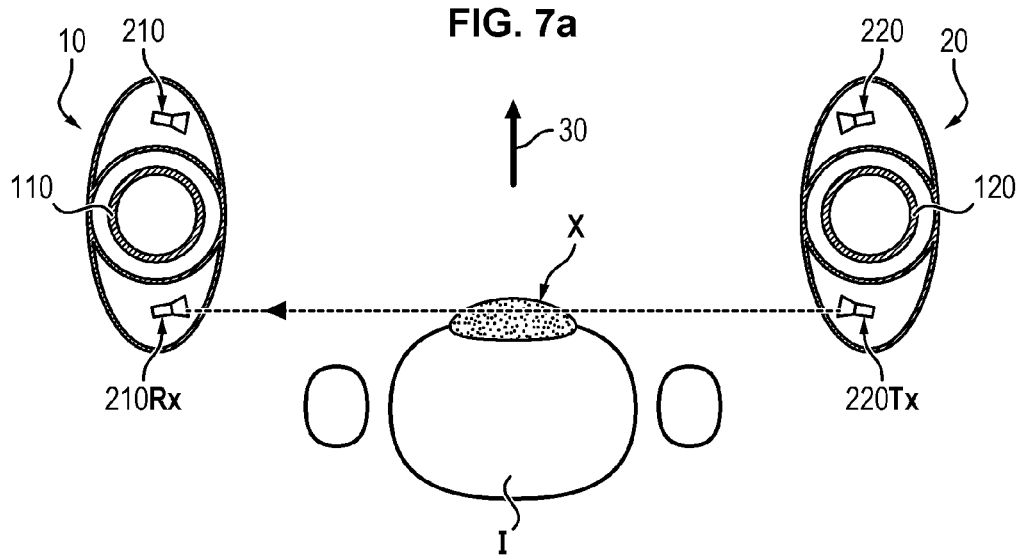
FIG. 7c illustrates the signal transmitted in the air between another pair of microwave transducers, FIG. 8a schematically illustrates in plan view the emissions/receptions microwaves in the case of an individual transiting via the channel and carrying on the rear a fraudulent object, FIG. 8b schematically illustrates the signal transmitted via this object characterized by a specific time delay and attenuation, whereas FIG. 8c schematically illustrates the signal reflected on the individual characterized by a specific time delay, FIG. 9a schematically illustrates in plan view the emissions/receptions microwaves in the case of an individual transiting via the channel and carrying on the front, but to one side, a fraudulent object and FIG. 9b schematically illustrates the signal transmitted via this object characterized by a specific time delay and attenuation, whereas FIG. 9c schematically illustrates the signal reflected on the individual characterized by a specific time delay and FIG. 9d schematically illustrates a double echo reflected of a part on the fraudulent object and of another part on the body of the individual each characterized by a specific time delay and attenuation.

FIG. 7 illustrate the operation of the device according to the present invention in the case where the individual I who is transiting via the channel 30 is carrying a fraudulent object X comprising a substance non-permeable to microwaves on the front of his body.

Figure 7B:
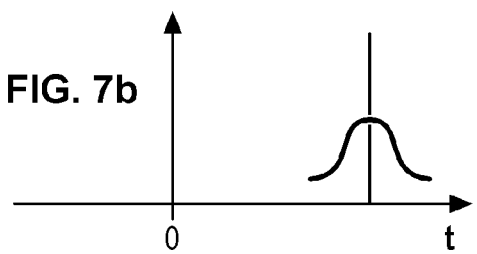

In this case the microwave beam emitted by a sender transducer 220Tx in the direction of an opposite receiver transducer 210 Rx is transmitted to the opposite receiver 210 Rx located on the opposite column with a delay and attenuation due to the substance X, when the object X intercepts the microwave beam as seen in FIG. 7*b*.

In these FIG. 7 the object X intercepts a microwave beam emitted on the input of the channel.

Figure 7C:
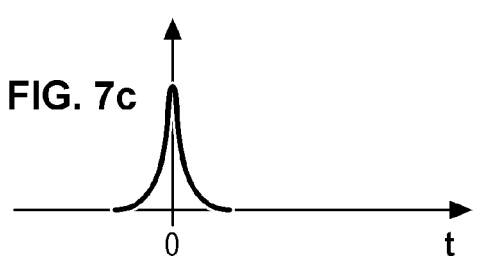

But as is similar to FIG. 4*b*, with the object X not being interleaved between the sender transducer 220Tx and the receiver transducer 210Rx located on the output of the channel 30, this receiver transducer 210Rx located on the output of the channel 30 receives a signal with only a slight delay due to the transmission in the air, without noticeable attenuation in amplitude, as illustrated in FIG. 7*c*.

When the individual I continues to move forward in the corridor 30, his body will reflect the microwave beam in the direction of the sender transducer as described previously opposite FIG. 5.

Then, when the individual reaches them, the pairs of transducers 210, 220 located at output of the channel 30 will undertake the same detections as the pairs of transducers 210, 220 located at input of the channel 30 operated when the individual enters the channel 30.

Figure 8A:
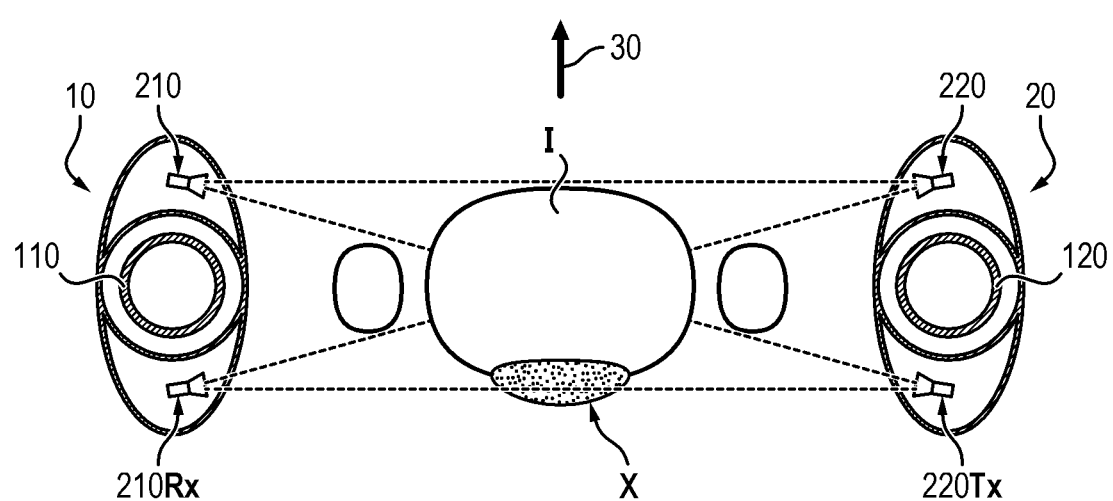

FIG. 8 illustrate the operation of the device according to the present invention in the case where the individual I transiting via the channel 30 is carrying a fraudulent object X comprising a substance non-permeable to microwaves on the rear of his body.

In this case in a first time the microwave beams emitted by the transducers 210, 220 located at the input of the channel 30 are hidden by the body of the individual when the latter intercepts the beams (situation comparable to FIG. 5).

Figure 8B:
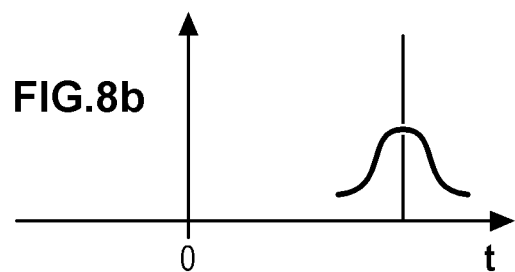

Then the beam microwave emitted by a sender transducer 220Tx in the direction of an opposite receiver transducer 210 Rx is transmitted to the opposite receiver 210 Rx located on the opposite column with a delay and attenuation due to the substance X, when the object X intercepts the microwave beam as is seen in FIG. 8*b*.

Figure 8C:
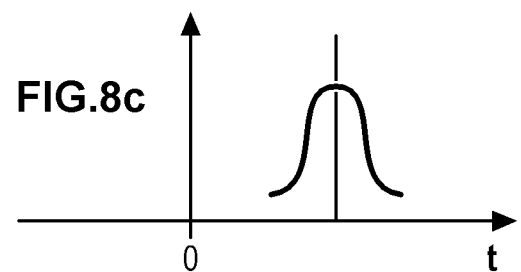

Simultaneously, if the longitudinal gap between the two series of transducers 210 and respectively 220 is small, his body will reflect the microwave beam in the direction of the sender transducer located at output of the channel 30 as described previously opposite FIG. 5. The corresponding reflected signal is illustrated in FIG. 8*c*. It is comparable to that of FIG. 5*b*.

But similarly to FIG. 4*b*, with the object X not being interleaved between the sender transducer 220Tx and the receiver transducer 210Rx located on the output of the channel 30, this receiver transducer 210Rx located on the output of the channel 30 again receives a signal with only a slight delay due to transmission in the air, without noticeable attenuation in amplitude, as is comparable to FIG. 4*b*.

When the individual I continues to move forward in the corridor 30, the pairs of transducers 210, 220 located at output of the channel 30 will operate, when the individual reaches them, the same detections as the pairs of transducers 210, 220 located at input of the channel 30 have operated when the individual is entre in the channel 30.

FIG. 9 illustrate the operation of the device according to the present invention in the case where the individual I transiting via the channel 30 is carrying a fraudulent object X comprising a substance non-permeable to microwaves on the front, but to one side of his body.

In this case in a first time the microwave beams emitted between the transducers 210, 220 located at the input of the channel 30 are hidden by the body of the individual when the latter intercepts these beams (situation comparable to FIG. 5; a beam emitted by the input sender 220Tx is reflected towards the latter as illustrated in FIG. 9*c* with a delay equal to 2*d/c), but the signal emitted by a sender transducer 220Tx located at output of the channel 30 in the direction of a receiver transducer 210Rx located at input of the channel 30 on the side of the object X is transmitted to this receiver 210 Rx with a delay and attenuation due to the substance X, when the object X intercepts the microwave beam as is seen in FIG. 9b.

However, similarly to FIG. 4b, with the object X not being interleaved between the sender transducer 220Tx and the receiver transducer 210Rx located on the output of the channel 30, this receiver transducer 210Rx located on the output of the channel 30 again receives from the output sender transducer 220Tx a signal with only a slight delay due to the transmission in the air, without noticeable attenuation in amplitude, comparably to FIG. 4b, whereas the beam emitted by a transducer 210 located at output in the direction of the object X is reflected towards this transducer 210 operating as receiver such that the latter receives two successive echoes, with different delays: a first echo X1 due to the reflection on the substance X and a second echo X2 due to the reflection on the body of the individual I, as illustrated in FIG. 9d.

When the individual I continues to move forward in the corridor 30, the pairs of transducers 210, 220 located at output of the channel 30 will operate, when the individual reaches them, the same detections as the pairs of transducers 210, 220 located at input of the channel 30 have operated when the individual enters the channel 30.

FIG. 10 illustrate the operation of the device according to the present invention in the case where the individual I transiting via the channel 30 is carrying a fraudulent object X comprising a substance non-permeable to microwaves on the front, but to one side of his body, as opposed to the case of FIG. 9.

The operation of the device is symmetrical, by a left/right symmetry to that described previously opposite FIG. 9. This operation as well as FIG. 10b (reception via the substance X received with a delay and attenuation due to the substance X), 10c (reflection by the body and reception on the sender transducer with a delay equal to 2*d/c) and 10d (two successive echoes, with different delays: a first echo X1 due to the reflection on the substance X and a second echo X2 due to the reflection on the body of the individual I) will therefore not be described in more detail below.

Figure 11A:
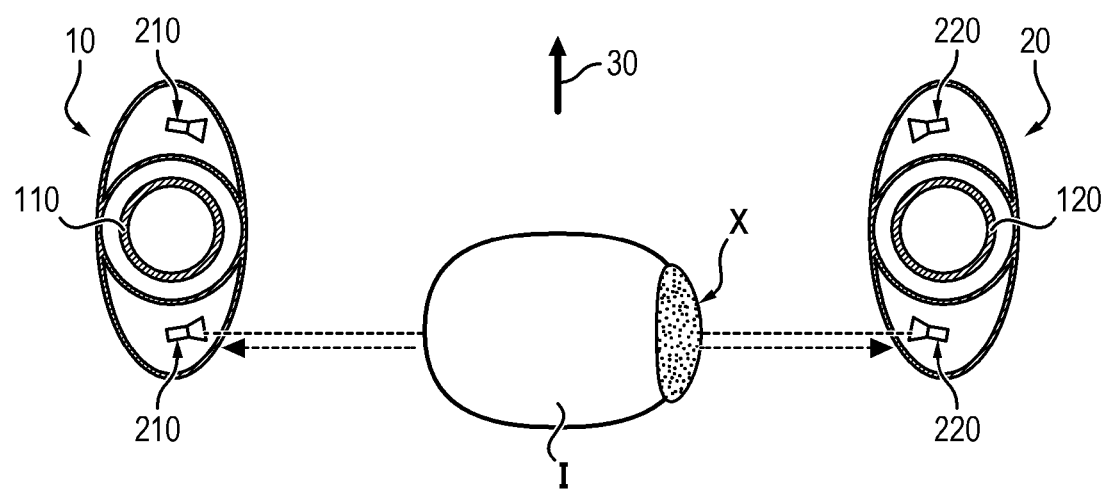
Figure 11B:
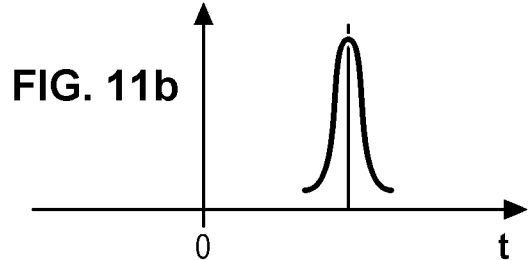

FIG. 11 correspond to the case of a fraudulent object X carried laterally by an individual I.

Figure 11C:
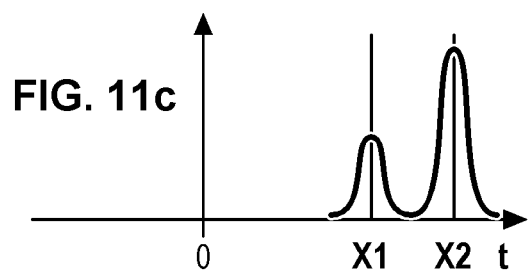

Here too, the transducers 210, 220 detect successively either a microwave beam substantially without delay and without attenuation when no object or body is interleaved between a sender transducer and a receiver transducer respectively associated, or a reflection with a delay equal to 2*d/c when the body of the individual is interleaved opposite a sender, or two echoes as illustrated in FIG. 11c when the fraudulent object X is located opposite a sender with different delays: a first echo X1 due to reflection on the substance X and a second echo X2 due to reflection on the body of the individual I.

Controlling sender/receiver couples 210, 220 and analysis of signals from a receiver Rx therefore detects the presence on an individual of an object X non-permeable to microwaves and gives a diagnosis as to the location of this object on the body of the individual I.

Generally, according to tests conducted by the inventors the second echo on the body has a greater amplitude than the first echo on the substance X which is only partially reflective.

The skilled person will understand from reading the preceding description that the invention enables detection of fraudulent non-metallic substances, for example explosives or drugs, carried by an individual by detection of the delay and amplitude of microwave signals transmitted via the substance and/or reflected by the substance, as well as by the body.

The analysis means 40 carry out comparison of the signals transmitted and/or reflected with transmission values in the air and/or signals reflected on a body devoid of fraudulent object.

The means 40 are adapted to generate an alarm when a significant gap exceeding a threshold is detected relative to the reference values.

The skilled person will actually understand that analysis of the sequences of signals received on the microwave transducers 210, 220 controls the progression of an individual in the channel 20, determines if this individual is carrying a dielectric substance delaying microwaves and determines by analysis of the chronology of sequences the carrying site on the individual.

Figures 13A, 13B:
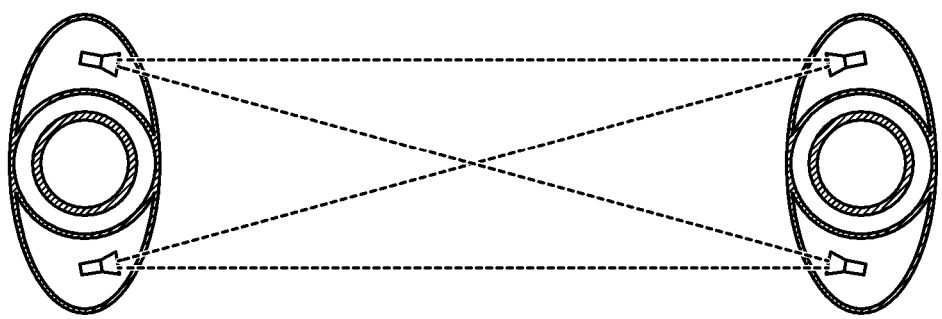
FIG. 13b illustrates a 4×4 matrix of possible interactions between these 4 transducers according to whether they are successively sender and/or receiver.
Figure 15A:
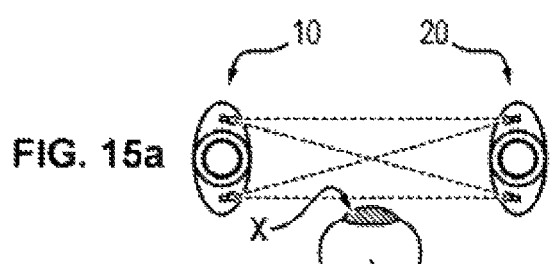
FIGS. 15a to 15g illustrate 7 successive steps of progression type of an individual in the channel, similar to FIGS. 14a to 14g, in the case where the individual carries on the front of his body a fraudulent dielectric element and the corresponding detection matrices on the microwave receiver transducers.
Figure 15B:
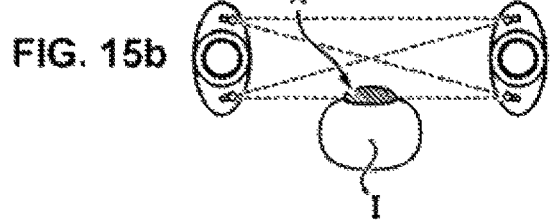
Figure 15C:
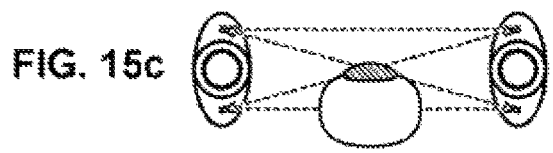
Figure 15D:
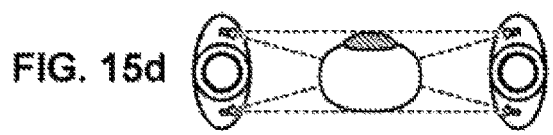
Figure 15E:
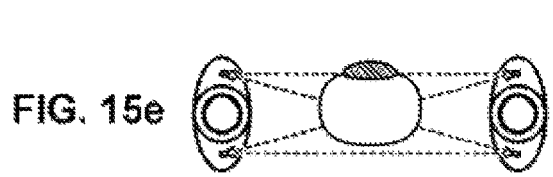
Figure 15F:
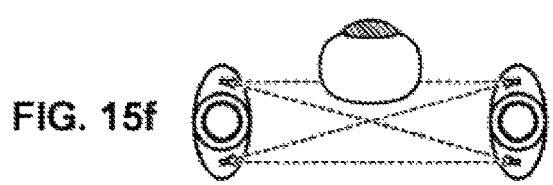
Figure 15G:
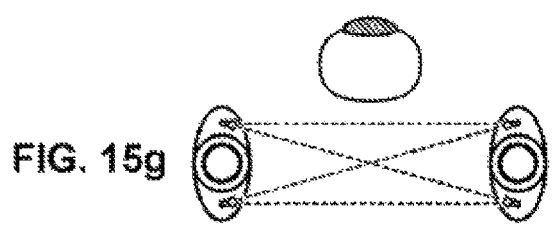
Figure 16A:
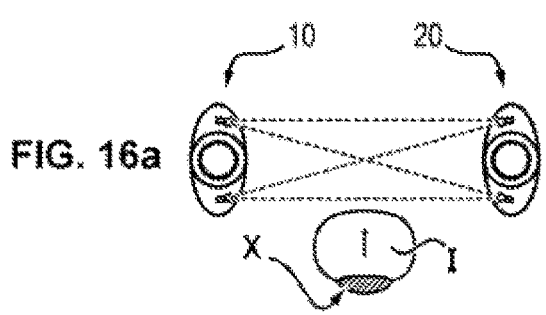
FIGS. 16a to 16g illustrate the successive steps of progression of an individual in the channel and the corresponding detection matrices on the microwave receiver transducers, similar to FIGS. 14a to 14g, in the case where the individual carries on the rear of his body a fraudulent dielectric element.
Figure 16B:
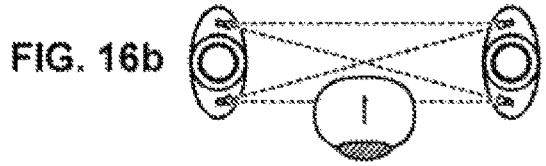
Figure 16C:
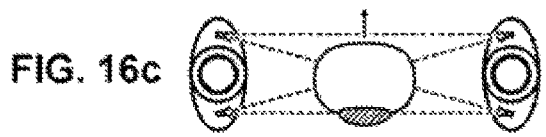
Figure 16D:
Figure 16E:
Figure 16F:
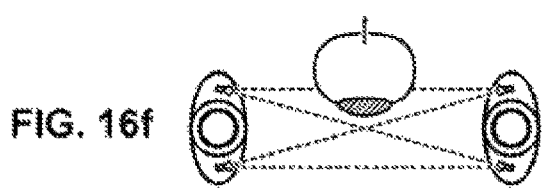
Figure 16G:
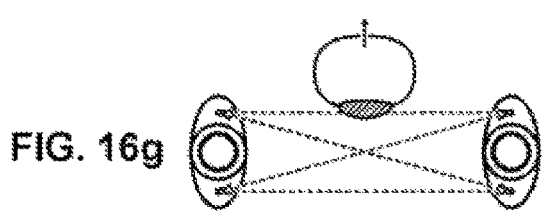

As indicated previously FIG. 13a schematically illustrates 4 transducers 210, 220 distributed by pairs at the same horizontal level on the two columns, due to a transducer located on the input and a transducer located on the output of each column 10, 20.

Also, FIG. 13b illustrates a matrix 4×4 of possible interactions between these 4 transducers according to whether they are successively sender and/or receiver.

In FIG. 13b the transducer 210 located to left and to the input of the channel is referenced 210TxGAv when it is sender and 210RxGAv when it is receiver. The transducer 220 located to the right and to the input of the channel is referenced 220TxDAv when it is sender and 220RxDAv when it is receiver. The transducer 210 located to left and to the output of the channel is referenced 210TxGAr when it is sender and 210RxGAr when it is receiver. The transducer 220 located to right and to the output of the channel is referenced 220TxDAr when it is sender and 220RxDAr when it is receiver.

FIGS. 14a to 14g illustrate 7 successive steps types of progression of an individual in the channel 30 and the corresponding detection matrices on the microwave receiver transducers. In FIG. 14 on an indicated "O" when the receiver receives no signal, "Rx" when it receives almost without delay neither attenuation the signal emanating from the associated sender, and "Echo" when it receives its own signal reflected by the body of the individual I, FIGS. 15a to 15g illustrate 7 successive steps of progression type of an individual I in the channel 30, similar to FIGS. 14a to 14g, in the case where the individual is carrying on the front of his body a fraudulent dielectric element X and the corresponding detection matrices on the microwave receiver transducers. In FIGS. 15 "O" is indicated when the receiver receives no signal, "Rx" when it receives no attenuation almost without delay, the signal from the associated sender, "Echo" when it receives its own signal reflected by the body of the individual I, and "Attenuated Delay" when it receives a delayed and attenuated signal transmitted via the fraudulent dielectric body X.

Also, as indicated previously:
  FIGS. 16a to 16g schematically illustrate successive steps of progression of an individual in the channel and the corresponding detection matrices on the microwave receiver transducers, similar to FIGS. 14a to 14g, in the case where the individual is carrying on the rear of his body a fraudulent dielectric element,
  FIGS. 17a to 17g schematically illustrate successive steps of progression of an individual in the channel and the corresponding detection matrices on the microwave receiver transducers, similar to FIGS. 14a to 14g, in the case where the individual is carrying on the front of his body and on son left side, a fraudulent dielectric element, and FIGS. 18a to 18g schematically illustrate the successive steps of progression of an individual in the channel and the corresponding detection matrices on the microwave receiver transducers, similar to FIGS. 14a to 14g, in the case where the individual is carrying on the front of his body and on his right side, a fraudulent dielectric element.

Examination compares the chronology of the status of the signals between FIGS. 14, 15, 16, 17 and 18 detects the presence of the object X and its location on the body of the individual.

The analysis means 40 exploit not only the evolution chronology of the signals on the same receiver transducer 210 or 220, but also the dissymmetries between the signals received on the receiver transducers 210 or 220 front and rear respectively, as well as the dissymmetries between the signals received on the receiver transducers 210 or 220 right and respectively left.

Of course, the number of sequences taken into account, here 7, is not limiting and must be adapted as a function of the relative dimensions of the channel, the cross-section of the individual and the preferred detection resolution.

Also, the reference matrices used to detect the presence of the object X must be multiplied to consider all possible positions of the object on the individual (on the front, on the rear or laterally) on the basis of the operating principles (direct transmission, reflection, double echo) described relative to FIGS. 4 to 11.

In practice several levels of transducers 210, 220 are provided, superposed vertically, for example 15 levels of transducers, and each transducer 210, 220 itself cooperates not only with the transducers of the same level, but also with the transducers of the lower level and the transducers of the upper level. The presence of these different levels of vertically superposed transducers pinpoints the vertical position of any dielectric object detected.

The analysis means therefore have a large number of matrices of detection signals allowing fine detection of the potential presence of dielectric material delaying microwaves, on an individual, and allowing the location of such material on the body of the individual, that is, both its position in height on the body, but also its position on a horizontal section of the body.

It is evident that, relative to FIGS. 9 to 11, the possibility has been mentioned of receiving double echoes due to reflection on the fraudulent substance X to be detected and due to reflection on the body of the individual I. However, according to the configuration and/or positioning of the fraudulent objects X to be detected, if needed a receiver transducer 210 or 220 can receive more than 2 echoes, as is mentioned especially in FIGS. 17c, 17e, 18c and 18e, or even expanded echoes.

Preferably, in terms of the invention, the means 300 are adapted to conduct at least one of the following steps and preferably the combination of all the following steps:

measuring the delay and the amplitude of direct transmission of microwaves between each pair of coaxial senders 210Tx, 220TX and receivers 210Rx, 220Rx located on the two opposite columns 10, 20, measuring the delay and the amplitude of oblique transmission of microwaves between each sender 210Tx, 220TX located on a column 10, 20 and the receivers 210Rx, 220Rx which frame the receiver located on the opposite column coaxial of the sender, measuring the delay and the amplitude of the microwave waves emitted by each sender transducer 210Tx, 220TX and reflected towards the same transducer forming receiver 210Rx, 220Rx or towards the receivers 210Rx, 220Rx framing the latter, by the body of an individual or by a fraudulent (non-metallic) substance carried by this individual, detection of the presence of a double echo of microwave waves reflected by a fraudulent substance and by the body of an individual, comparison of the microwave waves transmitted directly with a transmission reference value in the void and transmission of an alarm in case of detection of delay greater than a threshold and with an amplitude corresponding to a range of substances which delays and attenuates the microwaves, comparison of the microwave waves transmitted directly with microwaves transmitted on adjacent transducers and generation of an alarm in case of a gap greater than a threshold detected between the different signals (similar to the presence of a non-metallic substance non-permeable to microwaves), comparison of the oblique microwave waves with a reference value in the void and generation of an alarm in case of detection of delay greater than a threshold and with an amplitude corresponding to a range predetermined representative of substances which delay and attenuate the microwaves, comparison of the microwave waves transmitted obliquely with the directly adjacent transmitted microwave waves and generation of an alarm in case of a gap greater than a threshold detected between the different signals (similar to the presence of a non-metallic substance non-permeable to microwaves), comparison of a double echo detected with transmission values in the void and generation of an alarm in case of detection of a delay greater than a threshold between the peaks of the two echoes with an amplitude greater than a threshold (representative of a substance which reflects part of the wave (first echo) and which delays and attenuates the non-reflected signal (second echo)), measuring the height of the body of an individual travelling in the channel 30 which corresponds to a reflection of microwave wave, preferably in the region of each column, determining the position of an individual travelling in the channel, between the input and the output of the channel, by analysis of the signals from the transducers microwave receivers, measuring the modifications of inductive fields due to metallic substances carried by an individual travelling in the channel, displaying the height and of the right or left side of the channel on which a metallic object and a dielectric object are detected in correlation, displaying the silhouette front and rear type of the individual travelling in the channel, dimensioned in size on the basis of a measurement made by detection of reflection of microwave beams with positioning and indication of the nature of the metallic objects and the non-metallic dielectric objects detected, generation of inductive fields of metal detectors in the range of frequencies between 70 Hz and 30 kHz, generation of microwave beams in the range between 10 GHz and 90 GHz.

The device according to the present invention which has just been described can be completed by auxiliary equipment, for example by sampling and analysis means of substances, steam or traces of particles and/or by analysis means of nuclear magnetic resonance type, analysis means of complex impedance and/or detection means of radioactive radiations Such means are known per se in their general structure and will therefore will not be described in detail below.

Of course, the present invention is not limited to the embodiments previously described, but extends to all variants in keeping with its sense.

By way of detection of spatial correlation existing between the metallic objects and the dielectric materials detected, the present invention in particular allows reliable detection of explosives carried by individuals, for example explosive belts, especially comprising in combination small metallic objects. It also allows reliable detection of the content of briefcases carried by individuals, since the invention allows reliable detection over the full height of the columns, down to the floor.

The skilled person will understand that in contrast to body scanners which require each person to be checked to be stationary and therefore require static analysis, by using the movement of the person as spatial scanning of its perimeter relative to the columns of the inductive senders and receivers and to microwaves and by performing measuring of the time period and attenuation of the microwave pulse caused by the dielectric mass, the invention results in a measurement which takes place in a very limited and therefore very precise range or window.

The beams between the sending and receiving antennae are first partially hidden by the dielectric mass. In this phase also a good part of the energy is coupled directly, that is, does not shift to the dielectric but to the air because there are available paths in the air. As soon as the person moves forward, the beam Tx-Rx is progressively hidden to the point of having the sole energy residue transmitted passing through the dielectric, as no other path is possible. This position is the ideal position for measuring the dielectric properties of the material. The space range corresponding to this ideal condition (transition of the individual relative to the microwave beam) is 1 or 2 cm in the displacement of the checked individual.

Continuous monitoring of the microwave signals received is performed with a sampling frequency or repetition frequency of the high reading, typically between 10/second to 100/second. This frequency must be high enough to successfully make at least one measurement in optimal conditions (almost fully obscure beam, with energy residue transmitted by the dielectric mass only).

The invention claimed is:

1. A detector comprising:
 a first and a second column that delimit together a channel through which individuals to be checked can transit, wherein the first and the second columns comprise an entrance end and an exit end,
 windings distributed in the first and the second columns, said windings comprising emitting windings configured to emit a magnetic detection field and receiving windings configured to detect perturbations of the magnetic detection field caused when an individual travels through the channel,
 microwave transducers comprising microwave emitters and microwave receivers,
  wherein the microwave emitters are arranged at least in the first column and configured to send microwave signals from the first column towards the second column, and
  wherein the microwave receivers are arranged in the first and in the second columns, wherein the microwave receivers arranged in the second column are configured to receive the microwave signals sent by the microwave emitters arranged in the first column and the microwave receivers arranged in the first column are configured to receive the microwave signals after reflection against at least one of an individual transiting through the channel and the second column,
 wherein the first and the second columns each comprise a first set of the microwave transducers and a second set of the microwave transducers positioned on both sides of the windings along a height of the first and the second columns, such that the first set of the microwave transducers are positioned proximate to the entrance end and the second set of the microwave transducers are positioned proximate to the exit end,
 wherein the first set of microwave transducers and the second set of microwave transducers comprise the microwave emitters and the microwave receivers,
 wherein signals from the receiving windings are analyzed to detect a metal object carried by an individual transiting via said channel formed between the two columns, and
 wherein the microwave signals received by the microwave receivers of the first set of the microwave transducers and of the second set of the microwave transducers are analyzed to detect a dielectric material carried by an individual when the individual is transiting via said channel and to set up spatial correlations between the detected metal objects and the detected dielectric materials.

2. The detector according to claim 1, wherein a delay and an amplitude of the microwave signals are analyzed relative to a reference delay and a reference amplitude, respectively.

3. The detector according to claim 1, wherein the microwave signals are compared with one of the following reference signals: a reference signal representative of a transmission in a void or a reference signal representative of a reflection on a body.

4. The detector according to claim 1, wherein the analysis means generate an alarm is generated in case of detection of a gap greater than a threshold between one of the sent and/or received microwave signals and a reference signal.

5. The detector according to claim 1, wherein a vertical gap between two adjacent microwave transducers is comprised between 2 cm and 10 cm.

6. The detector according to claim 1, wherein the microwave transducers operate in a range of frequencies comprised between 5 GHz and 90 GHz.

7. The detector according to claim 1, wherein the microwave transducers arranged in the first columns are located respectively coaxially to the microwave transducers arranged in the second column.

8. The detector according to claim 1, wherein each microwave transducer is adapted to work alternatively as a microwave emitter or as a microwave receiver or as a microwave emitter and a microwave receiver.

9. The detector according to claim 1, wherein one of the microwave emitters arranged in the first column is configured to emit a microwave signal towards one of the microwave receivers, which is coaxial with the one of the microwave emitters and arranged in the second column, and towards one of the microwave transducers which are adjacent to the microwave receivers which are coaxial with the one of the microwave emitters.

10. The detector according to claim 1, wherein one of the microwave receivers arranged in the second column is configured to receive a microwave signal from one of the microwave emitters, which is coaxial with the one of the microwave receivers and arranged in the first column.

11. The detector according to claim 1, wherein the detector is further configured to:
   measure a delay and an amplitude of a direct signal of microwave signals between a plurality of pairs of microwave emitters and microwave receivers, wherein each pair comprises a microwave emitter arranged in the first column and a microwave receiver which is coaxial with the microwave emitter and arranged in the second column,
   measure a delay and an amplitude of an oblique signal of microwave signals between one of the microwave emitters arranged in the first column and one of the microwave receivers arranged in the second column which surround the one of the microwave receivers in the second column, which is coaxial with the one of the microwave emitters,
   measure a delay and an amplitude of a reflected signal of the microwave signals between the one of the microwave emitters arranged in the first column and the one of the microwave emitters after reflection of the microwave signals against the second column, a body or a fraudulent substance carried by an individual,
   measure a delay and an amplitude of a reflected signal of the microwave signals between the one of the microwave emitters arranged in the first column and the one of the microwave receivers surrounding the one of microwave emitters after reflection of said microwave signals against the second column, a body or a fraudulent substance carried by an individual,
   detect a double echo of microwave signals reflected by a fraudulent substance and by a body of an individual,
   transmitting an alarm when the delay of the direct signal is greater than a first threshold and the amplitude of the direct signal corresponds to a range of substances which delays and attenuates microwave signals,
   compare the direct signal and the oblique signal, and generate an alarm when a gap between the direct signal and the oblique signal is greater than a second threshold,
   generate an alarm when the delay of the oblique signal is greater than a third threshold and the amplitude of the oblique signal corresponds to the range of substances which delays and attenuates the microwave signals,
   generate an alarm when a delay between peaks of the double echo is greater than a fourth threshold and when an amplitude of the double echo is greater than a fifth threshold, or
   analyse an evolution over time of the microwave signals of the one of the microwave receivers.

12. The detector according to claim 1, wherein the detector is further configured to:
   measure a height of an individual travelling through the channel which corresponds to a reflection of microwave signals, preferably in a region of the first and second columns,
   determine a position of an individual travelling through the channel, between the entrance end and the exit end of the channel, by analyzing the microwave signals from the microwave receivers,
   measure a modifications of the magnetic detection field due to a metal object carried by an individual travelling through the channel,
   display the height and a right side or left side of the channel within which a metal object and a dielectric material are detected in correlation, or
   display a front silhouette and a rear silhouette of the individual travelling through the channel, a size of which being dimensioned based on a measurement made by detection of the microwave signals with positioning and indication of a nature of the detected metal object and the detected dielectric substance.

13. The detector according to claim 1, wherein the windings distributed in the two columns are configured to generate a magnetic detection field in a range of frequencies between 70 Hz and 30 kHz.

14. The detector according to claim 1, wherein a height of the first and the second columns is between 150 cm and 200 cm, advantageously between 150 cm and 180 cm.

15. The detector according to claim 1, the microwave transducers are superposed vertically in each of the first and the second columns.

16. The detector according to claim 1, the first set of microwave transducers and the second set of microwave transducers are superposed vertically in each of the first and the second columns.

17. The detector according to claim 16, wherein a horizontal distance between two microwave transducers located in a same column of the first and the second columns is between 10 cm and 30 cm.

18. The detector according to claim 1, wherein the microwave emitters and the microwave receivers operate in a range of frequencies comprised between 10 GHz and 30 GHz.

19. The detector according to claim 1, wherein the microwave emitters and the microwave receivers operate in a range of frequencies comprised between 12 GHz and 20 GHz.

20. A process for detection comprising the steps of:
   emission of a magnetic detection field and determining perturbations of the magnetic detection field caused when an individual travels through a channel,
      wherein the channel is defined by a first column and a second column,
      wherein the first and second columns comprise an entrance end and an exit end, and
      wherein each of the first and second columns include windings distributed in the first and second columns, said windings comprising emitting windings configured to emit the magnetic detection field and receiving windings configured to determine perturbations of the magnetic detection field caused when an individual travels through the channel;
   emission of microwave signals by microwave emitters arranged in the first column of a detector, wherein the microwave emitters are arranged at least in the first column and configured to send the microwave signals from the first column towards the second column, wherein the microwave receivers are arranged in the first and second columns;
   reception of the microwave signals sent by the microwave emitters arranged in the first column by the microwave receivers arranged in the first and second columns of a detector,
      wherein the first and the second columns each comprise a first set of microwave transducers and a second set of microwave transducers positioned on both sides of the windings along a height of the first and the second columns, such that the first set of the microwave transducers are positioned proximate to the entrance end and the second set of the microwave transducers are positioned proximate to the exit end, wherein the first set of microwave transducers and the second set of microwave transducers comprise the microwave emitters and the microwave receivers;

reception of the microwave signals by the microwave receivers arranged in the first column after reflection of said microwave signals against at least one of an individual transiting through the channel and the second column;

analyses of the determined perturbations of the magnetic detection field to detect a metal object carried by an individual, when the individual is transiting through the channel;

analyses of the microwave signals received by the microwave receivers arranged in the first and in the second columns when the individual is transiting through the channel to detect a dielectric material carried by the individual; and set up of spatial correlations between the detected the metal object and the detected dielectric materials.

21. The process according to claim 20 comprising at least one of the following steps:

measuring a delay and an amplitude of a direct signal of microwave signals between a plurality of pairs of microwave emitters and microwave receivers, wherein each pair comprises a microwave emitter arranged in the first column and a microwave receiver which is coaxial with the microwave emitter and arranged in the second column, measuring a delay and an amplitude of an oblique signal of microwave signals between one of the microwave emitters arranged in the first column and one of the microwave receivers arranged in the second column, wherein the one of the microwave receivers in the second column surround the one of the microwave receivers in the second column, which is coaxial with the one of the microwave emitters, measuring a delay and an amplitude of a reflected signal of the microwave signals between the one of the microwave emitters arranged in the first column after reflection of the microwave signals against the second column, a body or a fraudulent substance carried by an individual, measuring a delay and an amplitude of a reflected signal of the microwave signals between the one of the microwave emitters arranged in the first column and the one of the microwave receivers surrounding the one of the microwave emitters after reflection of the microwave signals against the second column, a body or a fraudulent substance carried by an individual, detecting a double echo of microwave signals reflected by a fraudulent substance and by a body of an individual, transmitting an alarm when the delay of the direct signal is greater than a first threshold and the amplitude of the direct signal corresponds to a range of substances which delays and attenuates microwave signals, comparing the direct signal and the oblique signal, and generating an alarm when a gap between the direct signal and the oblique signal is greater than a second threshold, generating an alarm when the delay of the oblique signal is greater than a third threshold and the amplitude of the oblique signal corresponds to the range of substances which delays and attenuates the microwave signals, generating an alarm when a delay between peaks of each echo of the double echo is greater than a fourth threshold and when an amplitude of the double echo is greater than a fifth threshold, analyzing an evolution over time of the microwave signals of one of the microwave receivers.

* * * * *